US011892638B2

(12) United States Patent
El-Haddad et al.

(10) Patent No.: US 11,892,638 B2
(45) Date of Patent: Feb. 6, 2024

(54) SCANNING NEAR-EYE IMAGING AND SENSING SYSTEM

(71) Applicant: Meta Platforms Technologies, LLC, Menlo Park, CA (US)

(72) Inventors: Mohamed Tarek Ahmed El-Haddad, Redmond, WA (US); Yang Yang, Redmond, WA (US); Francesco Larocca, Kirkland, WA (US); Robin Sharma, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/832,081

(22) Filed: Jun. 3, 2022

(65) Prior Publication Data
US 2023/0393400 A1    Dec. 7, 2023

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/0174* (2013.01); *G02B 2027/0178* (2013.01)

(58) Field of Classification Search
CPC .............. G02B 27/0172; G02B 27/0093
USPC ...................... 345/418; 250/227.15
See application file for complete search history.

(56) References Cited

U.S. PATENT DOCUMENTS

| 9,494,799 | B2 | 11/2016 | Robbins et al. |
| 9,836,122 | B2 | 12/2017 | Border |
| 10,545,346 | B2 | 1/2020 | Waldern et al. |
| 10,690,916 | B2 | 6/2020 | Popovich et al. |
| 10,715,794 | B2 | 7/2020 | Schowengerdt et al. |
| 10,809,537 | B1 * | 10/2020 | Lam .......... G02B 7/04 |
| 10,928,631 | B1 * | 2/2021 | Shahmohammadi ........ G02B 6/0035 |
| 2007/0187580 | A1 * | 8/2007 | Kykta ......... G02B 27/017 250/227.15 |
| 2016/0270656 | A1 * | 9/2016 | Samec .......... A61B 3/024 |
| 2018/0210547 | A1 | 7/2018 | Sarkar |
| 2019/0361247 | A1 | 11/2019 | Lanman et al. |
| 2020/0285045 | A1 * | 9/2020 | Baran ........ G02B 26/0858 |

(Continued)

OTHER PUBLICATIONS

Bartuzel M.M., et al., "High-Resolution, Ultrafast, Wide-Field Retinal Eye-Tracking for Enhanced Quantification of Fixational and Saccadic Motion," Biomedical Optics Express, 2020, vol. 11, No. 6, pp. 3164-3180.

(Continued)

*Primary Examiner* — Prabodh M Dharia
(74) *Attorney, Agent, or Firm* — FREESTONE INTELLECTUAL PROPERTY LAW PLLC; Aaron J. Visbeek

(57) ABSTRACT

A near-eye imaging system includes a light source, a waveguide, a scanner, and a sensor. The light source is configured to emit light. The waveguide includes an output coupler. The scanner is configured to direct the light to the output coupler at varying scan angles. The waveguide confines the light to guide the light to the output coupler. The output coupler has negative optical power and is configured to direct the light to exit the waveguide as expanding illumination light toward an eyebox region. The sensor is configured to generate a tracking signal in response to returning light incident on the sensor via the scanner and via the output coupler.

20 Claims, 16 Drawing Sheets

(56) References Cited

U.S. PATENT DOCUMENTS

2020/0371389 A1* 11/2020 Geng .................. G02B 6/0028
2021/0157142 A1* 5/2021 Scheller ................. H01L 24/08
2022/0146740 A1* 5/2022 Koshelev ........... G02B 6/29332

OTHER PUBLICATIONS

Glazowski C., et al., "Optimal Detection Pinhole for Lowering Speckle Noise While Maintaining Adequate Optical Sectioning in Confocal Reflectance Microscopes," Journal of Biomedical Optics, Aug. 2012, vol. 17, No. 8:085001, 6 pages.

Meyer J., et al., "A Novel Camera-Free Eye Tracking Sensor for Augmented Reality Based on Laser Scanning," IEEE Sensors Journal, 2020, vol. 20, No. 24, 9 pages.

Montigny E.D., et al., "Double-Clad Fiber Coupler for Partially Coherent Detection," Optics Express, 2015, vol. 23, No. 7, 12 pages, Retrieved from the Internet: URL: https://doi.org/10.1364/OE.23.009040.

Zhao J., et al., "Design of a High-Resolution Holographic Waveguide Eye-Tracking System Operating in Near-Infrared with Conventional Optical Elements," Optics Express, Jul. 19, 2021, vol. 29, No. 15, pp. 24536-24551.

* cited by examiner

SCANNING NEAR-EYE IMAGING AND SENSING SYSTEM

TECHNICAL FIELD

This disclosure relates generally to optics, and in particular to near-eye imaging.

BACKGROUND INFORMATION

Virtual reality (VR), augmented reality (AR), and mixed reality (MR) devices may utilize eye-tracking to enhance the user experience and increase functionality. Some eye-tracking systems illuminate an eyebox region with one or more LEDs and then image the eyebox region using temple-mounted cameras. Since the temple-mounted cameras are off-axis, occlusions (e.g. eyelashes) may negatively impact the captured images and additional image processing may be required on the images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
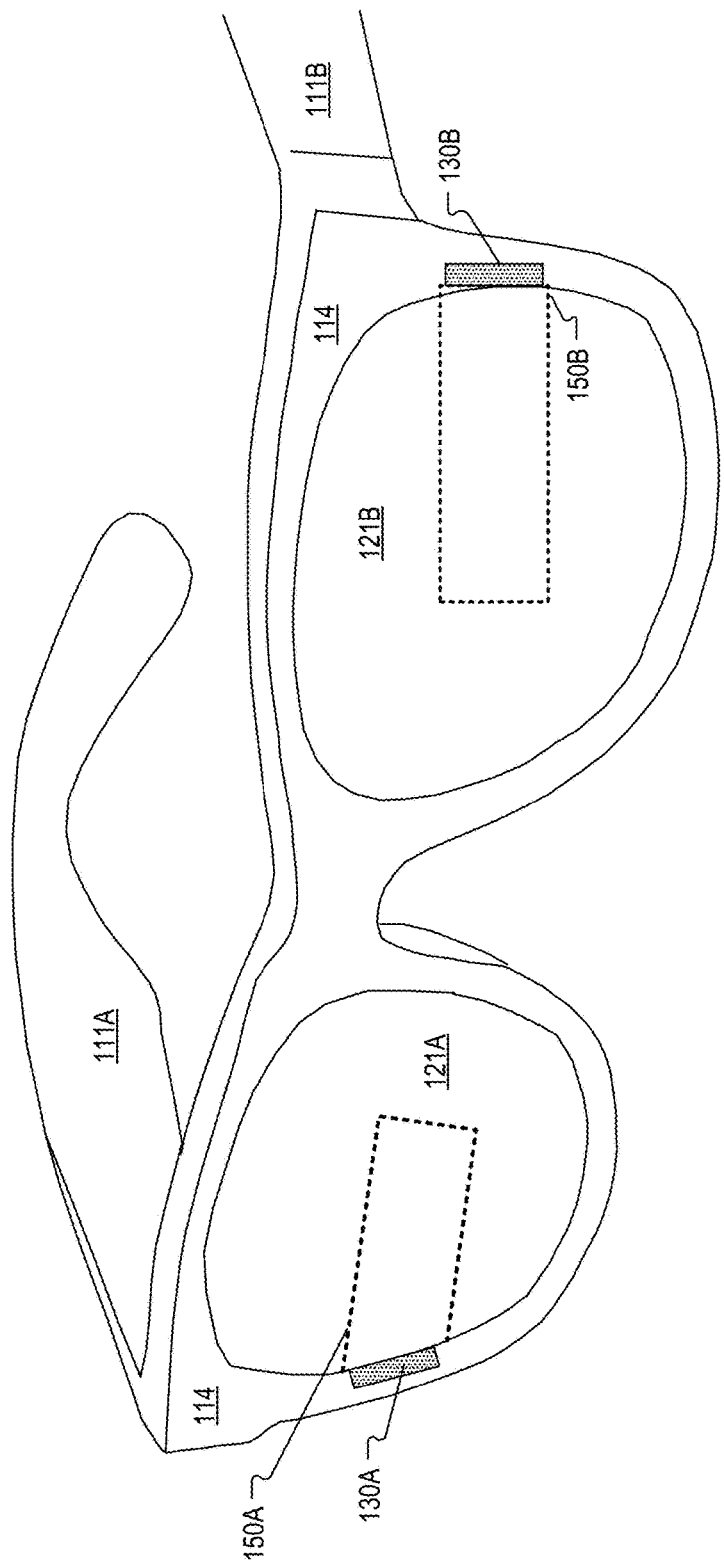
FIG. 1 illustrates a head mounted display (HMD) that may include a near-eye imaging system, in accordance with aspects of the disclosure.

Embodiments of devices and systems for near-eye imaging and sensing are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 90% transmission of light. In some aspects, the term "transparent" may be defined as a material having greater than 90% transmission of visible light.

Existing near-eye imaging systems may suffer from off-axis imaging which can decrease the quality of eye-tracking images. Implementations of the disclosure allow for on-axis or near on-axis imaging of the eyebox region using a waveguide and an output coupler that can be placed in a field of view (FOV) of a user. A scanner directs light (e.g. infrared light) to the output coupler via the waveguide to illuminate the eyebox region. The returning light that is reflected by the eyebox region is also directed back to a sensor via the scanner and via the output coupler. Therefore, an eye-tracking image can be generated by scanning through multiple imaging points in the eyebox region and then measuring the sensor output for each imaging point. In various implementations, the sensing detection path is configured for coherent detection, partially coherent, interferometric detection, and/or polarization-split detection. These and other embodiments are described in more detail in connection with FIGS. 1-10B.

FIG. 1 illustrates a head mounted display (HMD) 100 that may include a near-eye imaging system, in accordance with aspects of the present disclosure. Head mounted devices (e.g. smartglasses) that don't necessarily include a display may also utilize the near-eye imaging systems disclosed herein. HMD 100 includes frame 114 coupled to arms 111A and 111B. Lens assemblies 121A and 121B are mounted to frame 104. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a waveguide 150A/150B to direct image light generated by a display 130A/130B to an eyebox area for viewing by a user of HMD 100. Displays 130A/130B may include a liquid crystal display (LCD), an organic light emitting diode (OLED) display, micro-LED display, quantum dot display, pico-projector, a beam-scanning display, or liquid crystal on silicon (LCOS) display for directing image light to a wearer of HMD 100.

Lens assemblies 121A and 121B may appear transparent to a user to facilitate augmented reality or mixed reality to enable a user to view scene light from the environment around her while also receiving image light directed to her eye(s) by, for example, waveguides 150. Lens assemblies 121A and 121B may include two or more optical layers for different functionalities such as display, eye-tracking, and optical power. In some embodiments, display light from display 130A or 130B is only directed into one eye of the wearer of HMD 100. In an embodiment, both displays 130A and 130B are used to direct image light into waveguides 150A and 150B, respectively.

Frame 114 and arms 111 may include supporting hardware of HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Figure 2:
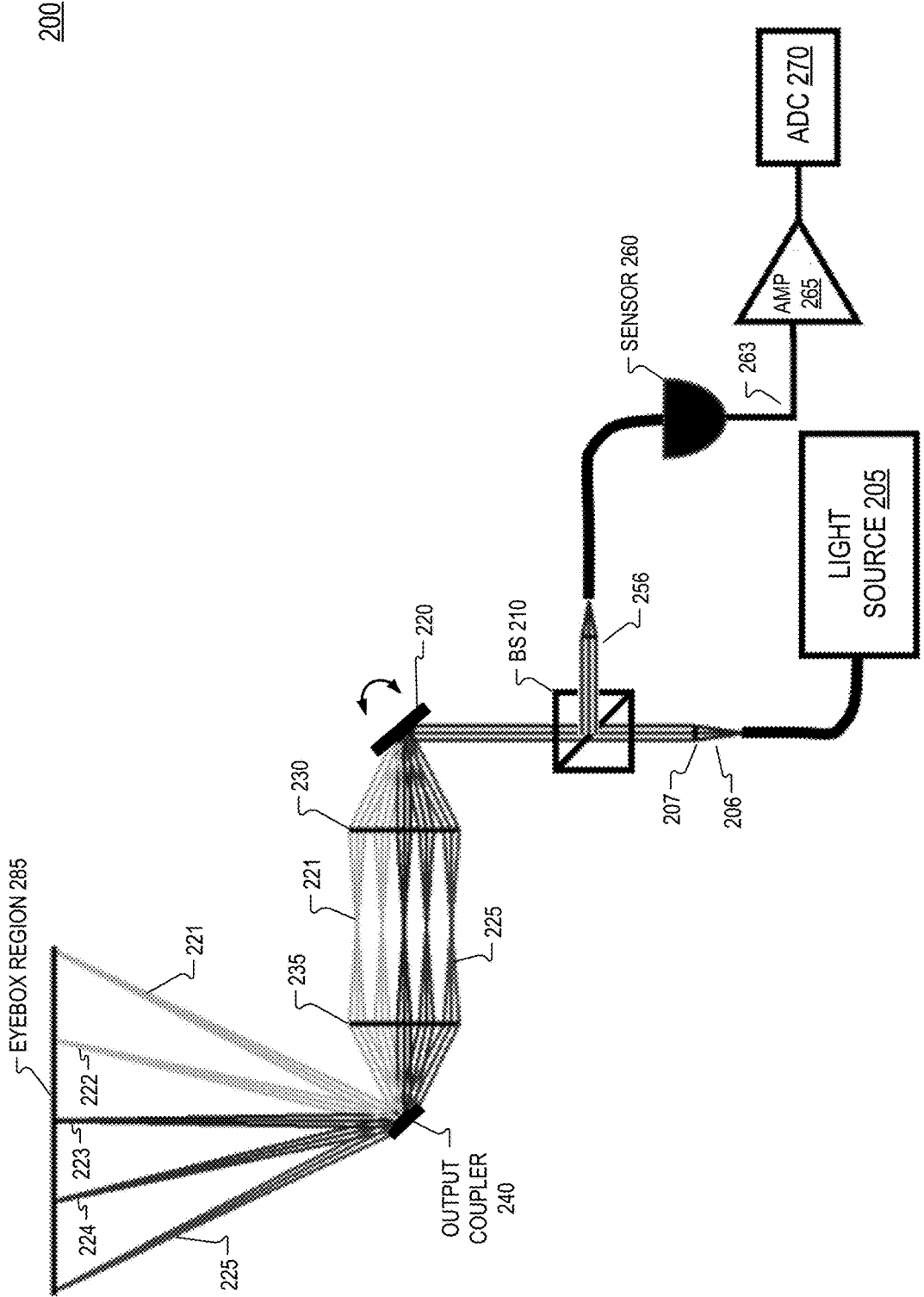
FIG. 2 illustrates a block diagram schematic of a scanning system, in accordance with aspects of the disclosure.

FIG. 2 illustrates a block diagram schematic of a scanning system 200 for overview description purposes, in accordance with implementations of the disclosure. System 200 has an illumination path including light source 205, a beam splitter 210, a scanner 220, optional relay optics 230 and 235, and output coupler 240 illuminating eyebox region 285 with illumination light. FIG. 2 illustrates different ray bundles 221, 222, 223, 224, and 225 to illustrate the scanner 220 may move in a two-dimensional manner to direct the light to different imaging points in eyebox region 285. In the sensing path of system 200, returning light propagates to beam splitter 210 in a reverse-optical path as the light illuminating eyebox region 285. Hence, system 200 may be considered a "double-pass system." The returning light is the illumination light reflecting/scattering from an eye occupying eyebox region 285, for example. Skin, eyelashes, or eyebrows may also reflect/scatter the illumination light illuminating eyebox region 285. The returning light propagates to output coupler 240, propagates through optional focusing optics 230 and 235 (if any), reflects off of scanner 220, and reflects off of beam splitter 210 as returning light 256 to sensor 260. A waveguide or optical fiber may be optically coupled to guide returning light 256 from beam splitter 210 to sensor 260. Implementations of this disclosure that describe fibers or optical fibers may be implemented in any combination of bulk optics, fiber optics, or integrated-photonic components.

Sensor 260 generates a tracking signal 263 in response to returning light 256 being incident on sensor 260. An analog-to-digital converter (ADC) 270 may convert an analog tracking signal to a digital tracking signal, if needed. ADC 270 may provide the digital signal to processing logic configured to generate an eye-tracking image based at least in part from tracking signals. As scanner 220 scans through illuminating different imaging points of eyebox region 285, a tracking signal 263 may be generated by sensor 260 for each imaging point and stored to memory. Thus, each imaging point within eyebox region 285 may have its own tracking signal 263 associated with the imaging point so that the tracking signals can be aggregated to assist in generating an eye-tracking image of eyebox region 285.

Light source 205 may be a coherent light source. Light source 205 emits narrow-band light 206 having a linewidth of less than 1 nm, in some implementations. Light source 205 may include one or more light emitting diodes (LEDs), a vertical-cavity surface-emitting lasers (VCSELs), micro light emitting diodes (micro-LED), edge emitting LEDs, a superluminescent diode (SLED), or another type of light source. Light source 205 may emit infrared light. The infrared light may be near-infrared light. Optional lens 207 may be used to control the beam shape at the scanner or at the eyebox. For example, optional lens 207 may be designed such that the ray bundles 221-225 are collimated or focused. Optional lens 207 may also provide a focus-turning mechanism that controls where the ray bundles focus along the optical path.

Beam splitter 210 may be a polarized beam splitter (PBS), in some implementations. Scanner 220 may include a micro-electro-mechanical systems (MEMS) scanner having a reflective surface that can be moved/adjusted along two rotation axes. Sensor 260 is a light-sensitive sensor. Sensor 260 may include one or more photodiodes.

Output coupler 240 may be a diffractive optical element configured to operate on the specific wavelength of light 206 emitted by light source 205 while passing other wavelengths of light. Output coupler 240 may be a holographic optical element configured to operate on the specific wavelength of light 206 emitted by light source 205. Output coupler 240 may be reflective or refractive, in some implementations. In an implementation, output coupler 240 is configured to diffract near-infrared light while passing (undiffracted) visible light. Passing visible light may allow for display light (if any) or scene light from an external environment of a head mounted device to propagate through output coupler 240 to be viewed by a user of the head mounted device.

Figure 3:
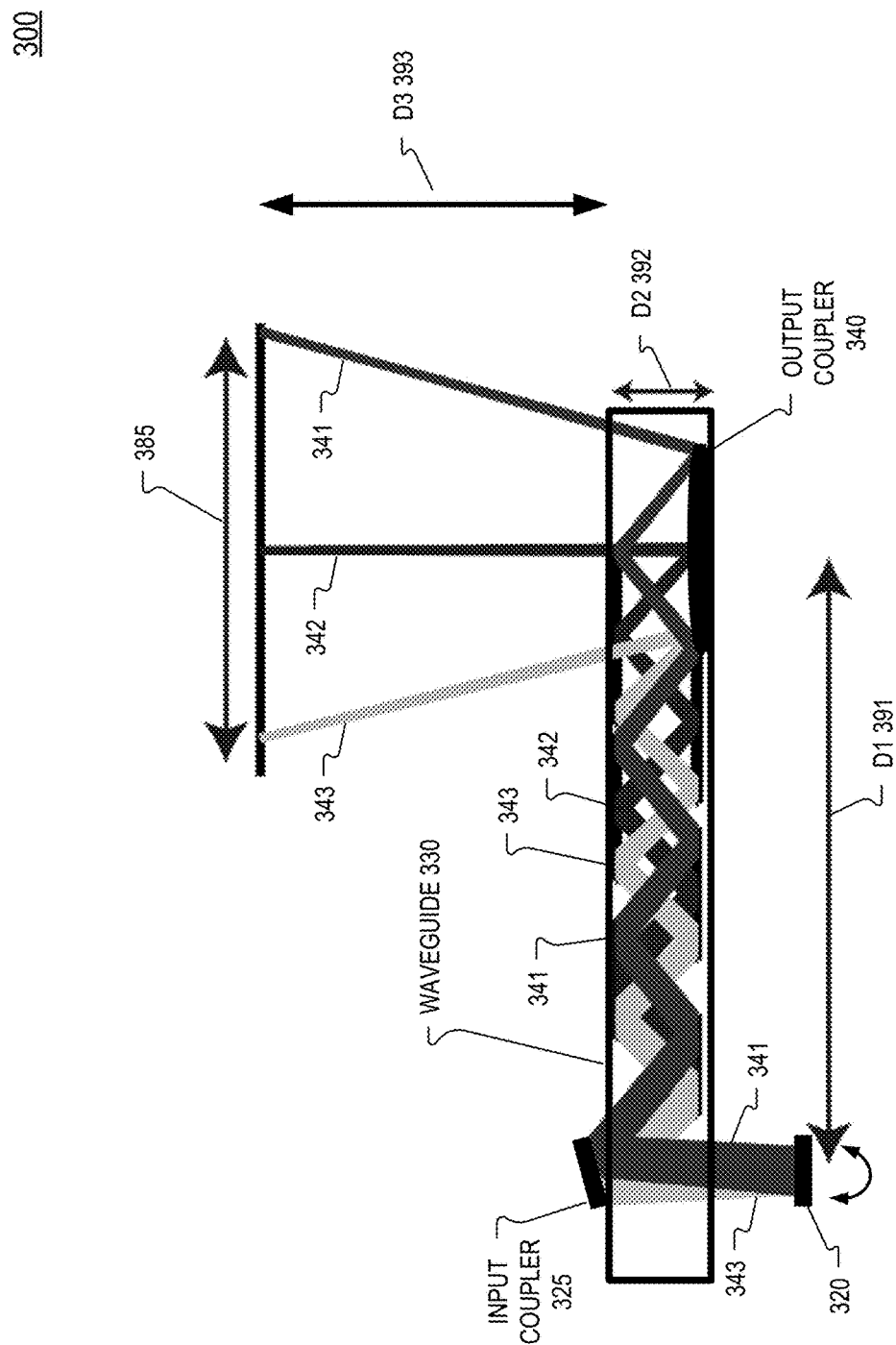
FIG. 3 illustrates a system that shows how the system of FIG. 2 may be implemented in a waveguide context, in accordance with aspects of the disclosure.

FIG. 3 illustrates a system 300 that shows how system 200 may be implemented in a waveguide context, in accordance with aspects of the disclosure. System 300 includes scanner 320, an input coupler 325, waveguide 330, and output coupler 340. The components may have similar functionality as described with respect to the components of FIG. 2. While not particularly illustrated, a light source, beam splitter, sensor, amplifier, and ADC may be included in system 300.

In operation, scanner 320 receives light (e.g. light 206) and directs (e.g. reflects) the light to input coupler 325 at varying scan angles. Input coupler 325 may be a diffractive optical element or a mirror. Input coupler 325 may be a transmissive diffractive optical element or a reflective diffractive optical element and may be positioned accordingly. FIG. 3 illustrates that scanner 320 scans the received light at a varying angles to generate varying light paths 341, 342, and 343 to direct the light to different imaging points within eyebox 385. Those skilled in the art appreciate that the illustrated light paths 341, 342, and 343 are representative light paths and that many more light paths will be used as scanner 320 scans at varying angles.

Input coupler 325 may be configured to diffract the received light at an angle that allows waveguide 330 to confine the light by way of Total Internal Reflection (TIR), in some implementations. Thus, the light is incoupled into waveguide 330 by input coupler 325 and propagates to output coupler 340 confined by waveguide 330. In some implementations, the depth D2 392 of waveguide 330 is approximately 0.5 mm. Dimension D1 392 between the scan-pivot of scanner 320 and a middle of output coupler 340 may be approximately 27 mm, in some implementations. The position of output coupler 340 may be configured such that it is on-axis or approximately on-axis with respect to a vector that is normal to a cornea plane of the eye of a user when the user is looking straight forward.

FIG. 3 illustrates that output coupler 340 has negative optical power and is therefore configured to direct the received light received from scanner 320 to exit waveguide 330 as expanding illumination light toward eyebox region 385. Output coupler 340 is configured to direct the incident light received from scanner 320 out of the waveguide 330 beyond a critical angle of the waveguide so that the directed light will no longer be confined by TIR from the boundary of waveguide 330. The negative optical power (and expanding illumination light) of output coupler 340 has the benefit of expanding the dimensions of the eyebox that can be imaged by system 300. For example, the eyebox region 385 may be 20 mm by 20 mm, in some implementations. In contrast, prior telecentric near-eye imaging systems have a more limited field-of-view for imaging the eyebox region.

Figure 4:
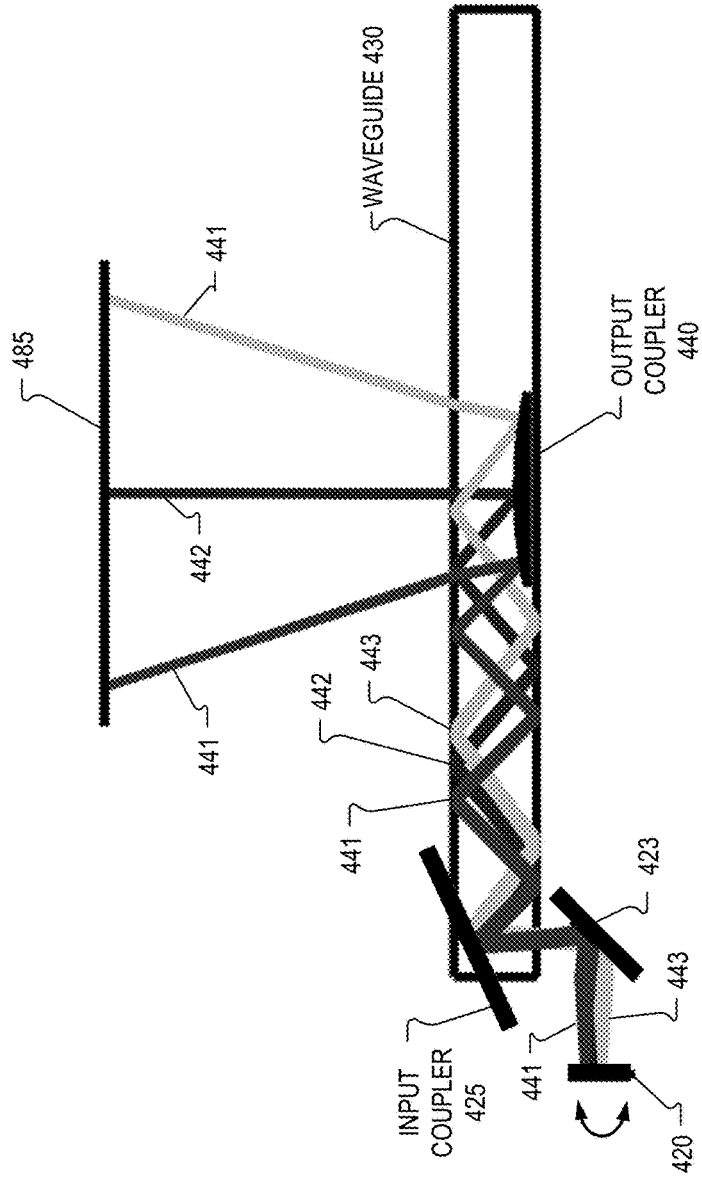
FIG. 4 illustrates a system having an additional optical component, in accordance with aspects of the disclosure.

FIG. 4 illustrates a system 400 having an additional optical component, in accordance with implementations of the disclosure. In the illustrated implementation of FIG. 4, a reflective optical component 423 is disposed in the optical path between scanner 420 and input coupler 425. Thus, reflective optical component 423 directs light received from scanner 420 to input coupler 425 and input coupler 425 directs the light to be incoupled into waveguide 430. Scanner 420 scans the received light at varying angles to generate varying light paths 441, 442, and 443 to direct the light to different imaging points within eyebox 485. Output coupler 440 is configured to direct the received light to exit waveguide 430 as expanding illumination light toward eyebox region 485. FIG. 4 may illustrate a non-sequential ray tracing mode in contrast to a sequential ray tracing mode illustrated by system 300 of FIG. 3.

Figure 5A:
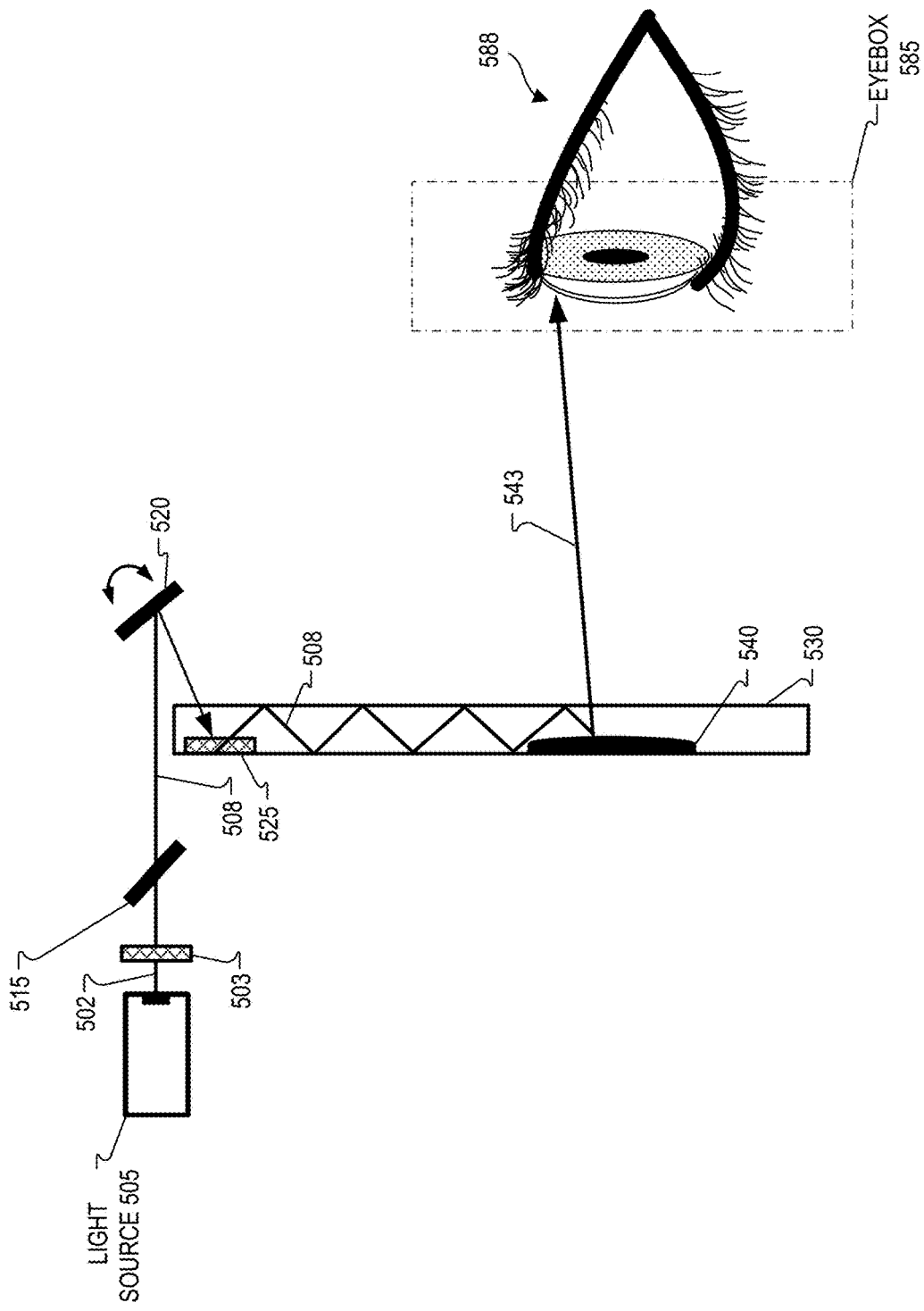
FIG. 5A illustrates an illumination path of a near-eye imaging system, in accordance with aspects of the disclosure.

FIG. 5A illustrates an illumination path of a near-eye imaging system 500, in accordance with implementation of the disclosure. System 500 includes a light source 505, optional polarizer 503, a beam splitter 515, scanner 520, input coupler 525, waveguide 530, and output coupler 540. In operation, light source 505 emits light 502. Light 502 may be polarized by polarizer 503 such that the light that propagates to beam splitter 515 has a first polarization orientation. At least a portion of light 502 propagates through beam splitter 515 and continues to scanner 520 as light 508. Scanner 520 directs light 502 to output coupler 540 at varying scan angles, although a single scan angle is illustrated in FIG. 5A for discussion purposes.

Scanner 520 directs light 508 to input coupler 525 and input coupler 525 incouples light 508 into waveguide 530 so that light 508 is guided to output coupler 540. Output coupler 540 is configured to direct light 508 out of waveguide 530 as illumination light 543. Output coupler 540 may be a two-dimensional output coupler where the exit angle of illumination light 543 is dependent on the position and/or angle that light 508 becomes incident on output coupler 540. For example, if light 508 is incident in the middle of output coupler 540, the light may be outcoupled as illumination light directed normal to a pupil plane of eye 588 occupying eyebox 585. In the illustrated implementation, the example illustrated scan angle is not in the middle of output coupler 540 and the illumination light 543 is directed to eyebox region 585 at a slightly rising angle. When considered in the aggregate, the varying scan angles (not particularly illustrated) will result in output coupler 540 illuminating eyebox region 585 with expanding illumination light. Output coupler 540 may be configured to provide a single incidence (a single interaction) of light 508 with output coupler 540 over the varying scan angles of scanner 520. Input coupler 525 and output coupler 540 may be freeform optical elements that enable control of aberrations and distortions to achieve a desired optical performance such as minimizing spot size over the image plane, controlling angular spread of light rays propagating inside waveguide 530, and/or controlling the field curvature at the image plane.

Figure 5B:
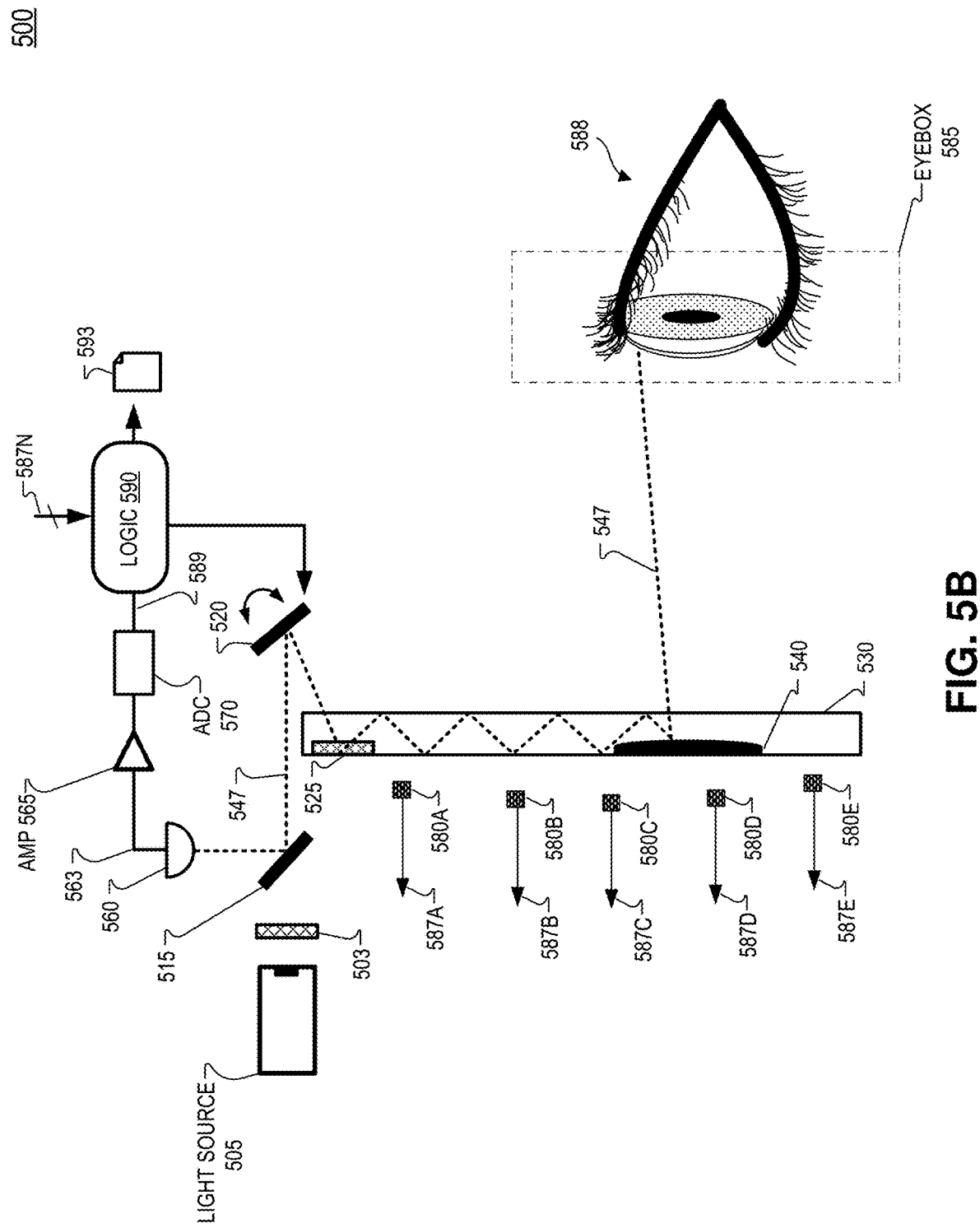
FIG. 5B illustrates a sensing path of near-eye imaging system, in accordance with aspects of the disclosure.

FIG. 5B illustrates a sensing path of near-eye imaging system 500, in accordance with implementation of the disclosure. Returning light 547 is the portion of illumination light 543 being reflected/scattered by eye 588 (or skin/eyelashes) back to output coupler 540 in a reverse optical path of illumination light 543. Returning light 547 is incident on output coupler 540 at a same position as illumination light 543 exited output coupler 540 and output coupler 540 directs returning light 547 to propagate in waveguide 530 toward input coupler 525. Input coupler 525 directs returning light 547 back to scanner 520 which reflects the returning light to beam splitter 515. Given the speed of light, scanner 520 is in the same scan position (same scan angle) when light 508 is reflected by scanner 520 and when returning light 547 is reflected by scanner 520.

Beam splitter 515 reflects at least a portion of returning light 547 to sensor 560. Sensor 560 may have the features of sensor 260, for example. Sensor 560 is configured to generate a tracking signal 563 in response to returning light 547 incident on sensor 560 via scanner 520 and via output coupler 540. In the illustrated implementation, returning light 547 also becomes incident on sensor 560 via input coupler 525 and beam splitter 515. Output coupler 540 may be configured to focus returning light 547 to an image plane of sensor 560. In an implementation, output coupler 540 is configured to introduce a pre-specified Petzval curvature at the image plane to better match an eye curvature of eye 588. In implementations where output coupler 540 is configured to provide a single incidence (a single interaction) of light 508 with output coupler 540 over the varying scan angles of scanner 520, output coupler 540 is also configured for a single incidence of returning light 547 with output coupler 540 over the varying scan angles.

Tracking signal 563 may be amplified by amplifier 565 and ADC 570 may generate a digital tracking signal 589 that is provided to processing logic 590. Processing logic 590 may be configured to generate an eye-tracking image 593 based at least in part on a plurality of tracking signals that are read-out sequentially from sensor 560 as scanner 520 scans through a plurality of imaging points in eyebox 585. In the illustrated implementation, processing logic 590 is configured to drive scanner 520 to progress through the varying scan angles in a scan sequence.

FIG. 5B illustrates that some implementations of the disclosure may include a plurality of event-photodetectors. FIG. 5B illustrates example event-photodetectors 580A, 580B, 580C, 580D, and 580E configured to generate output event signals 587A, 587B, 587C, 587D, and 587E, respectively. Event-photodetectors 580A, 580B, 580C, 580D, and 580E may collectively be referred to as event-photodetectors 580 and event signals 587A, 587B, 587C, 587D, and 587E may collectively be referred to as event signals 587. Event-photodetectors 580 are configured to receive glint or specular reflections (not specifically illustrated in FIG. 5B) of the expanding illumination light 543 reflecting from eyebox region 585. Event-photodetectors 580 are configured to output the event signals 587 when an intensity of the glint reflections reaches an event-threshold. The event-threshold may indicate a certain intensity of the glint reflection, for example. Processing logic 590 may receive the plurality of event signals 587N (where N is the number of event-photodetectors and corresponding event signals 587) from the event-photodetectors 580. Processing logic 590 may generate eye-tracking image 593 based at least in part on the tracking signals 589 and the event signals 587N. In an implementation, glints derived from the event signals 587N overlay an eye-tracking image generated from tracking signals 589. In an implementation, photodetectors 580 generate a complementary image along with the imaging from sensor 560.

Figure 6A:
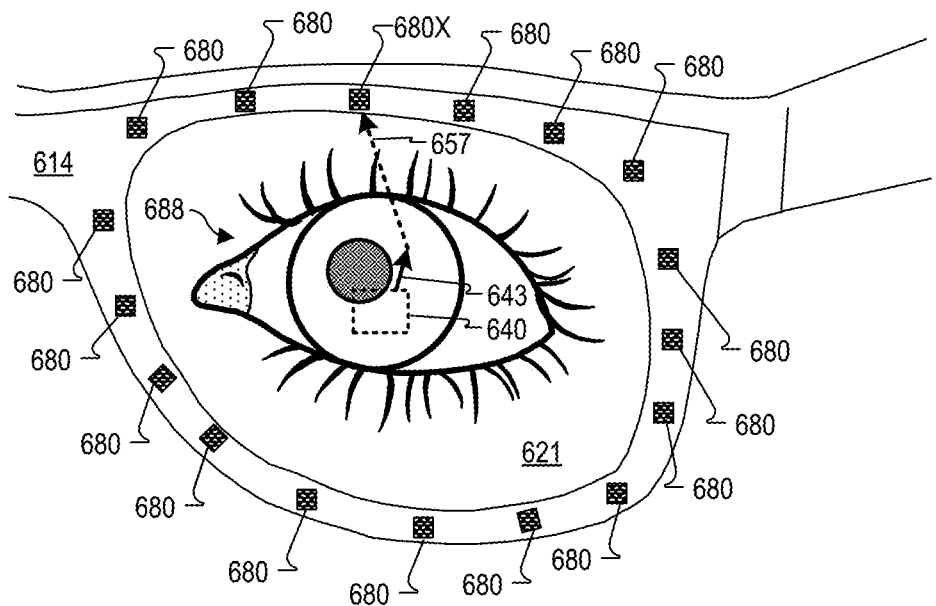
FIGS. 6A-6F illustrate event-photodetectors arranged in an Around-The-Lens configuration of a head mounted device, in accordance with aspects of the disclosure.

FIGS. 6A-6F illustrate event-photodetectors arranged in an Around-The-Lens configuration of a head mounted device, in accordance with implementations of the disclosure. FIG. 6A illustrates event-photodetectors 680 arranged in a frame 614 around-the-lens of a lens 621 of a head mounted device. The event-photodetectors 680 are configured to receive light reflecting from eye 688 occupying an eyebox region of the head mounted device. Lens 621 includes an output coupler 640 that directs illumination light 643 to an eyebox region that eye 688 occupies. Lens 621 may also include a waveguide (not illustrated) such as waveguide 530 to guide light to output coupler 640. The illumination light 643 is reflected by the eye (or skin/eyelash in the eyebox) as glint reflection 657. Eye 688 is looking slightly upward and inward (noseward) in FIG. 6A, which may cause the intensity of glint reflection 657 to be great enough to generate an event signal from the event-photodetector 680X while not generating an event signal in the other event-photodetectors in the plurality of event-photodetectors 680.

Figure 6B:
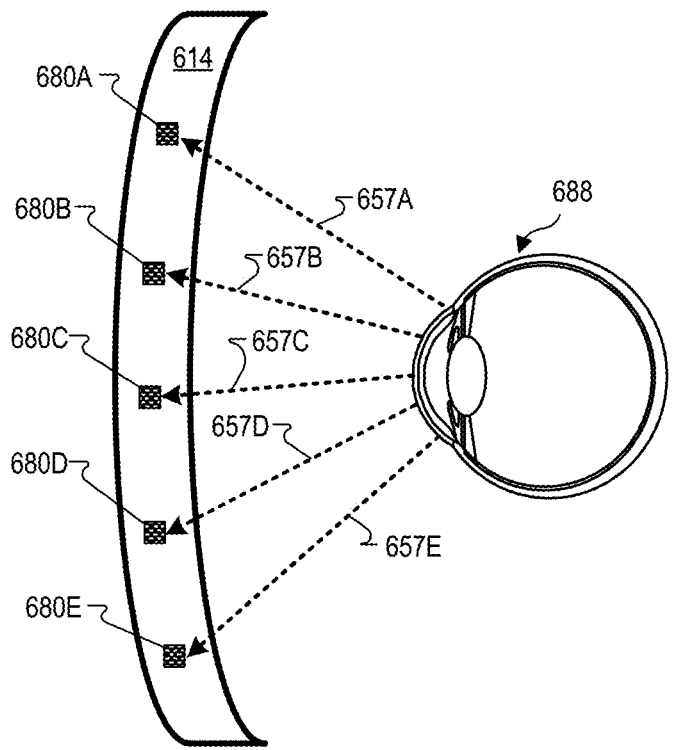

FIG. 6B illustrates an overhead view of event-photodetectors 680A-680E and a portion of frame 614. Event-photodetectors 680A, 680B, 680C, 680D, and 680E may be referred to collectively as event-photodetectors 680 and glint reflections 657A, 657B, 657C, 657D, and 657E may be referred to collectively as glint reflections 657. Depending on where eye 688 is positioned, a different glint reflection may generate an event signal from an event-photodetector. By way of example and not limitation, if eye 688 is looking to the far right, it may generate an intensity in glint reflection 657A that triggers an event signal generation by event-photodetector 680A; if eye 688 is looking straight forward, it may generate an intensity in glint reflection 657C that triggers an event signal generation by event-photodetector 680C; and if eye 688 is looking to the far left, it may generate an intensity in glint reflection 657E that triggers an event signal generation by event-photodetector 680E.

Figure 6C:
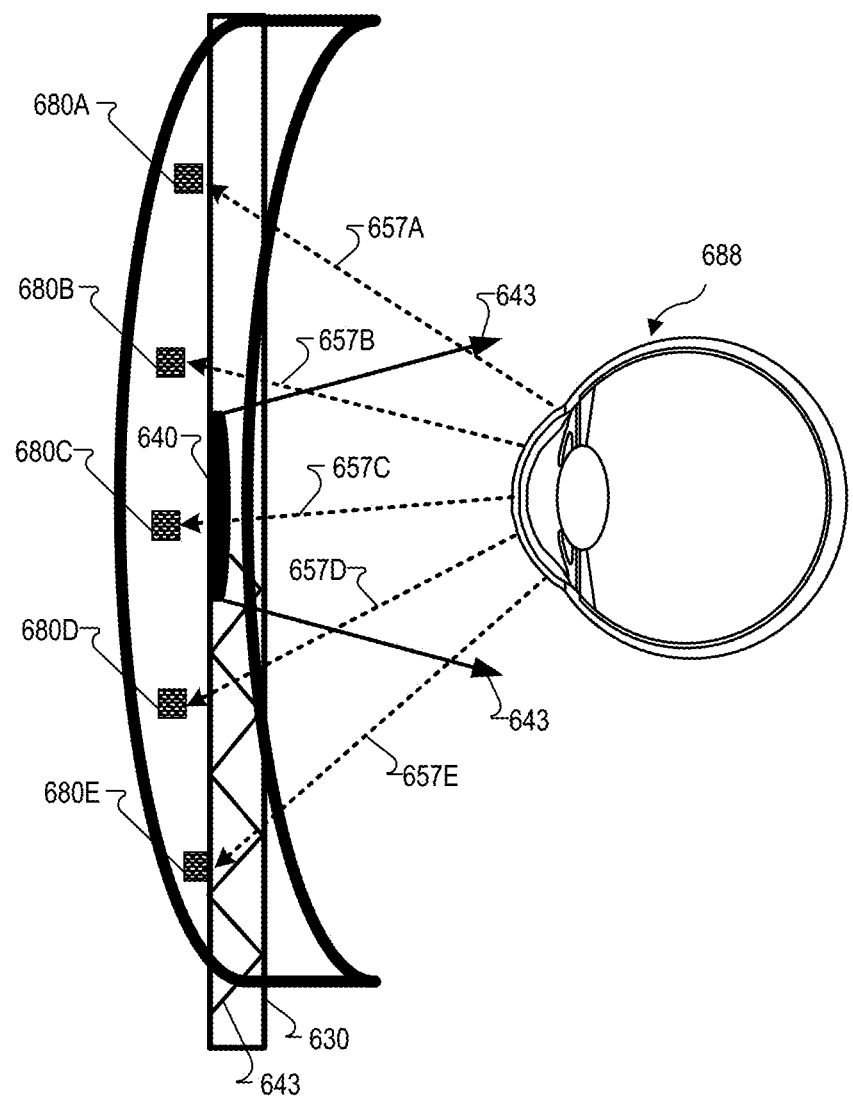

FIG. 6C illustrates a waveguide 630 guiding light 643 to output coupler 640 that directs light 643 to an eyebox region as expanding illumination light 643. The eyebox region is occupied by eye 688. Glint reflections 657 are reflections of expanding illumination light 643.

Figure 6D:
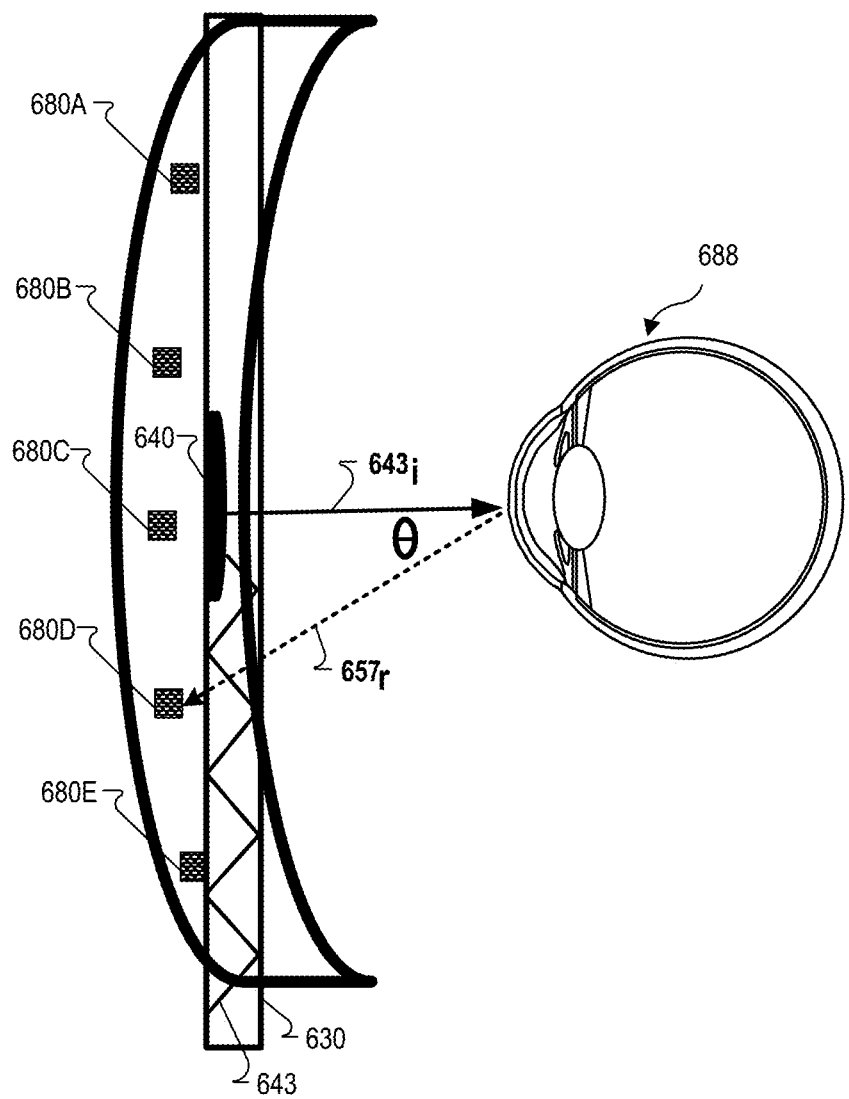

FIG. 6D illustrates that triangulation of (1) a surface normal of eye 688; and (2) a depth of eye 688 in the eyebox region may be triangulated based on incident vector $643_i$, reflected vector $657_r$, and calculated angle θ. At any given time, the incident vector $643_i$ is known based on the scan angle of the scanner (e.g. scanner 520). And, if an event signal is generated by event-photodetector 680D, the reflected vector $657_r$ has an intensity above a threshold level that may require the surface normal of the cornea of eye 688 to be pointed in a particular direction. Thus, the surface normal and/or depth of eye 688 may be determined.

Figure 6E:
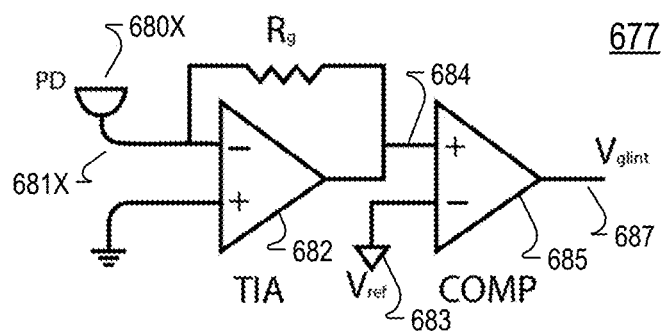

FIG. 6E illustrates an example threshold electrical circuit 677 for setting an event-threshold for an intensity of light. A glint reflection 657 may become incident on event-photodetector 680X and generate a glint signal 681X. The glint signal 681X is provided to an input of a transimpedance amplifier (TIA) 682 having a gain $R_g$. The amplified glint signal 684 is then provided to an input of comparator 685. If the amplified glint signal 684 is greater than the $V_{ref}$ 683 provided to the other input of comparator 685, an event signal 687 is generated by threshold electrical circuit 677. Therefore, the event-threshold can be tuned by adjusting $V_{ref}$ 683 of circuit 677. Those skilled in the art understand that circuit 677 is just an example and that other electrical and/or optical circuits may be used to generate event signals according to a particular event-threshold.

Event-photodetectors described in the disclosure may be photodiodes, silicon photomultipliers, heterojunction phototransistors, and/or avalanche photodiodes. In some implementations, the event-photodetectors are configured to be sensitive to dark field scatter. In some implementations, the event-photodetectors have differing polarizers disposed over the event-photodetectors so that a portion of the plurality of photodetectors are sensitive to different polarization orientations of glint reflections 657. In some implementations, the event-photodetectors may include angle-sensitive photodetectors.

Figure 6F:
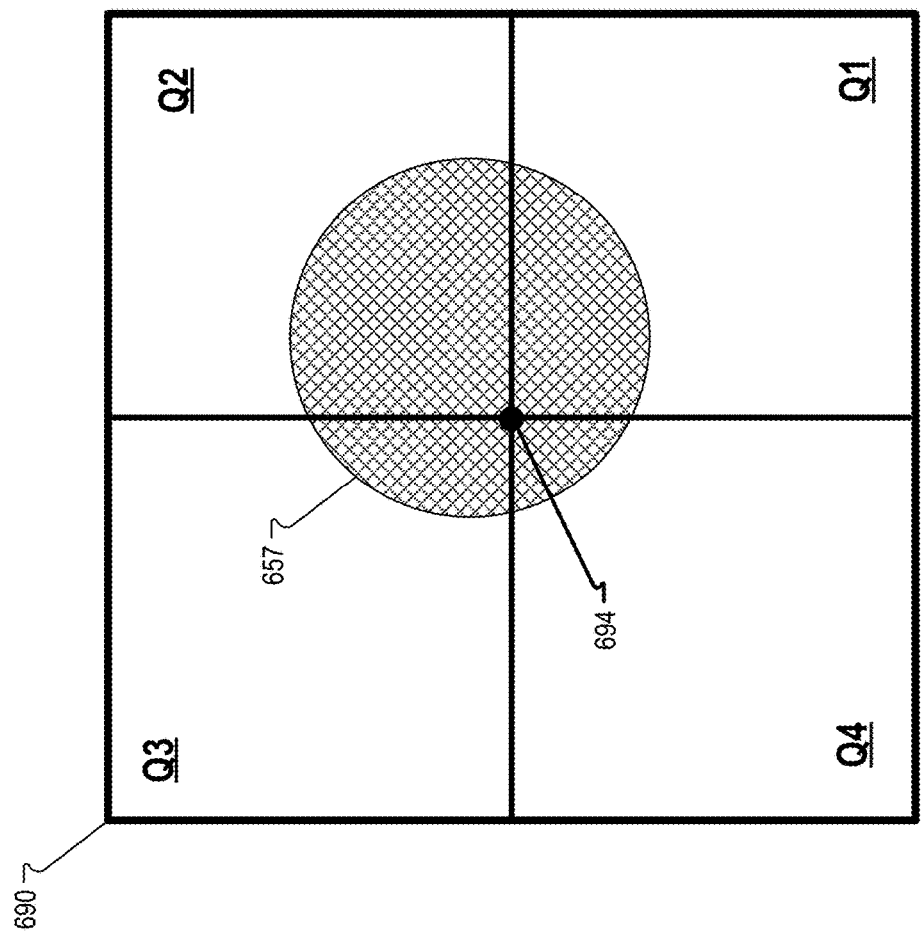

FIG. 6F illustrates an example quad sensor 690 that may be used as an angle-sensitive photodetector. Example quad sensor 690 includes quadrature Q1, quadrature Q2, quadrature Q3, and quadrature Q4. By measuring the intensity of the signal of the four quadratures, a positioning of the glint reflections 657 with respect to a middle 694 of the sensor 690 can be determined. When a particular glint reflection 657 is centered with respect to the middle 694, each quadrature may output a same signal level, for example. When a particular glint reflection is not centered with respect to middle 694, the signals from the different quadratures will increase and decrease with respect to the intensity of the glint reflection incident on the particular quadrature. Thus, an angle-sensitive photodetector for one or more of event-photodetectors 580/680 can provide even more granular information of the surface-normal of eye 688.

Figure 7:
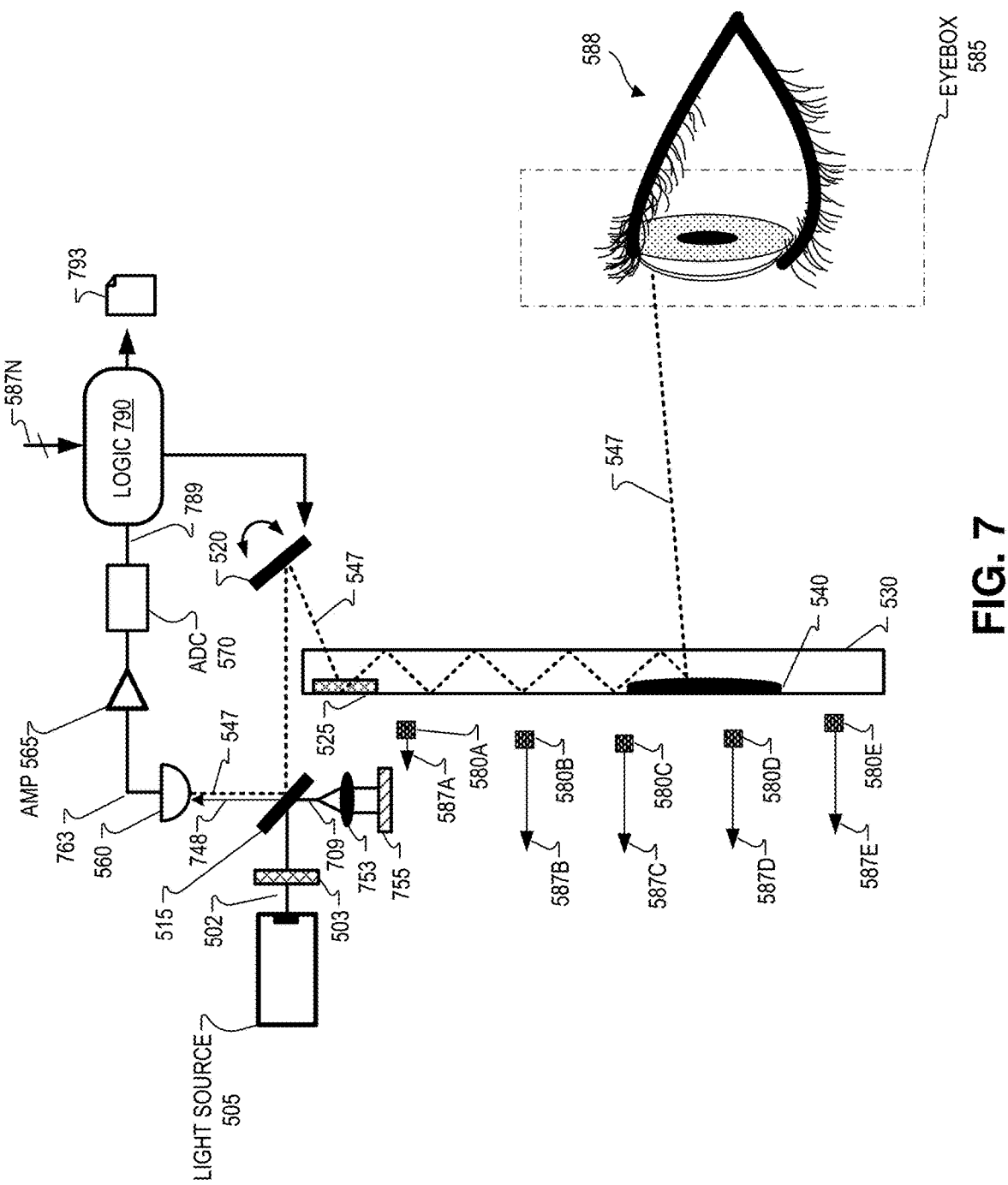
FIG. 7 illustrates a system having an interferometric sensing path, in accordance with aspects of the disclosure.

FIG. 7 illustrates a system 700 having an interferometric sensing path, in accordance with implementations of the disclosure. FIG. 7 includes at least a portion of the components of system 500 in FIGS. 5A and 5B. System 700 includes a reference arm to facilitate interferometric detection. The reference arm includes a reflective element 755 configured to receive and reflect at least a portion of light 709 received from beam splitter 515. The reference arm may also include optional focusing optics 753 and an optical fiber or waveguide to provide a specific optical path length for light 709. The optical path length of reference arm may be approximately the same as the optical path length of light 502 propagating between beam splitter 515 to eye 588 and back to beam splitter 515 as returning light 547. In some implementations, the reference arm path length is tunable.

In the operation of system 700, light source 505 emits coherent light as light 502. A portion of light 502 propagates through beam splitter 515 and reflects off of scanner 520, encountering input coupler 525, waveguide 530, and output coupler 540 prior to becoming incident on eye 588. The illumination path is similar to the illustration of FIG. 5A.

FIG. 7 illustrates the sensing path of returning light 547 encountering output coupler 540, waveguide 530, input coupler 525, reflecting off of scanner 520 and encountering beam splitter 515. A portion of returning light 547 is directed to sensor 560. Sensor 560 also receives reference light 748 from the reference arm that includes reflective element 755 and optional refractive element 753. Reference light 748 is the portion of light 709 that is reflected by reflective element 755 and passes through beam splitter 515 to become incident on sensor 560. The interference of reference light 748 and returning light 547 measured by sensor 560 generates a tracking signal 763. Amplifier 565 may amplify tracking signal 763 and ADC 570 may generate a digital tracking signal 789. Processing of tracking signal 763/789 by processing logic 790 (e.g. performing a Fourier transform), may assist in determining a depth of eye 588 with respect to output coupler 540.

Processing logic 790 may be configured to generate an eye-tracking image 793 based at least in part on a plurality of tracking signals that are read-out sequentially from sensor 560 as scanner 520 scans through a plurality of imaging points in eyebox 585. In the illustrated implementation, processing logic 790 is configured to drive scanner 520 to progress through the varying scan angles in a scan sequence that images different imaging points in eyebox 585. Processing logic 790 may generate eye-tracking image 793 based at least in part on the tracking signals 789 and the event signals 587N.

Figure 8A:
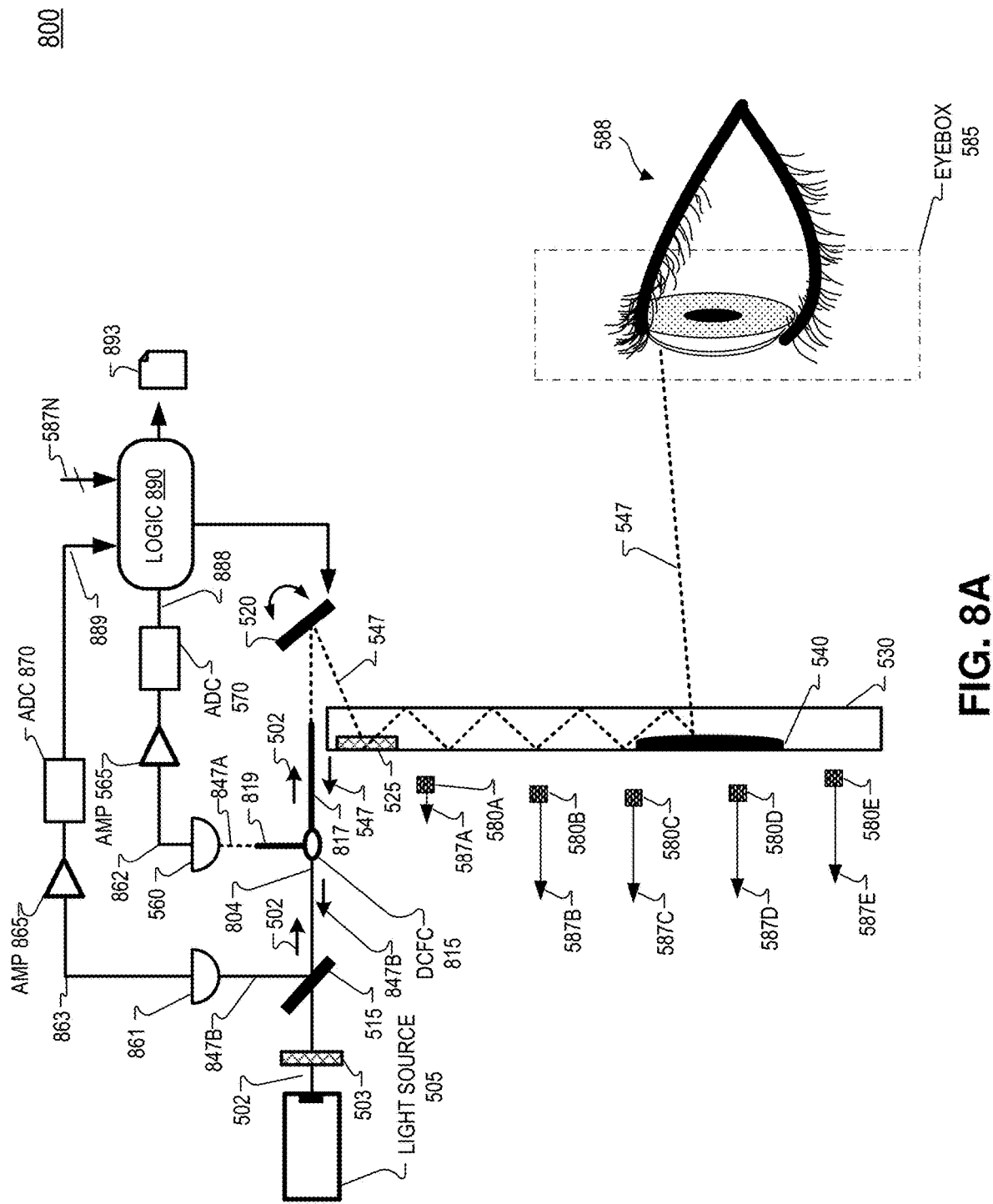
FIGS. 8A-8C illustrate a system having a multi-mode sensing path and example dual-clad fibers for use in the multi-mode sensing path, in accordance with aspects of the disclosure.

FIG. 8A illustrates a system 800 having a multi-mode sensing path, in accordance with implementations of the disclosure. FIG. 8A includes at least a portion of the components of system 500 in FIGS. 5A and 5B. System 800 includes a double clad fiber coupler (DCFC) 815, a dual-clad fiber 817, single-mode fiber 804, and a multi-mode fiber 819. Dual-clad fiber 817 is configured to provide light 502 to scanner 520 and configured to provide the returning light 547 from the scanner 520 to DCFC 815. Dual-clad fiber 817 is configured to carry both single-mode light and multi-mode light.

Figure 8B:
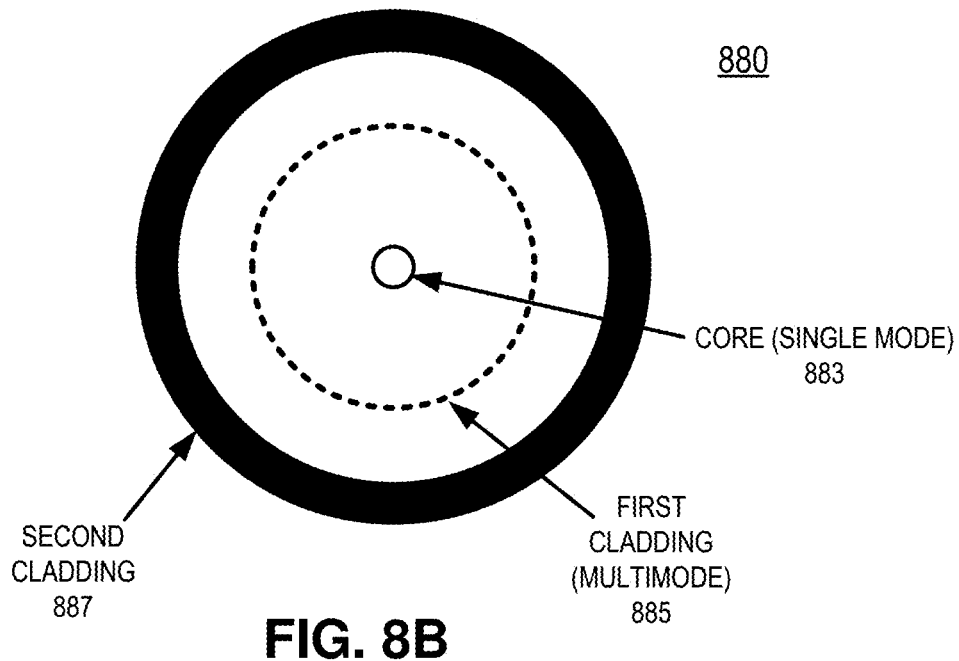
Figure 8C:
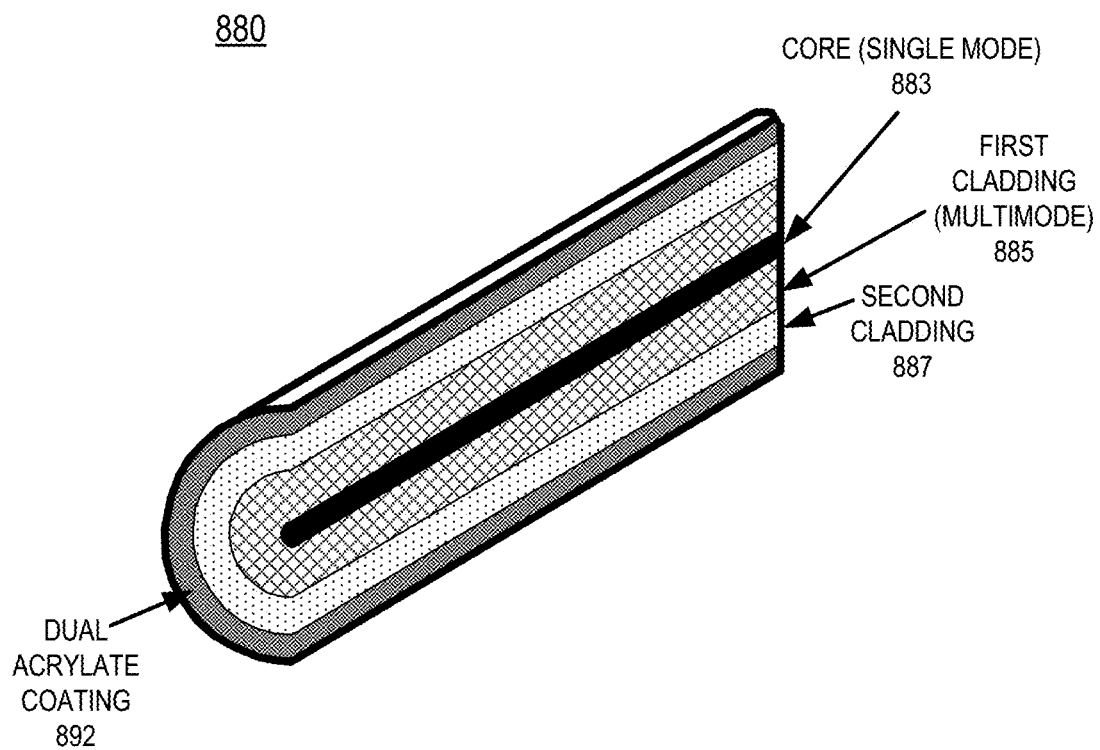

FIGS. 8B and 8C illustrate an example dual-clad fiber 880, in accordance with implementations of the disclosure. FIG. 8B illustrates an axial view of dual-clad fiber 880 and FIG. 8C illustrates a perspective view of a sliced view of dual-clad fiber 880. Dual-clad fiber 880 includes a core 883 for carrying the single-mode light, a first cladding 885 for carrying multi-mode light, a second cladding 887, and a dual acrylate coating 892 to protect the dual-clad fiber 880.

Returning again to FIG. 8A, single-mode fiber 804 is coupled between beam splitter 515 and DCFC 815. Single-mode returning light 847A propagates through single-mode fiber 804 and is reflected (at least partially) by beam splitter 515. Photodetector 861 is configured to receive a at least a portion of light 847B from beam splitter 515. Single-mode fiber 804 may be optically coupled to DCFC 815 although single-mode light 847A may propagate in free space in the optical path between DCFC 815 and photodetector 861. Photodetector 861 may include one or more photodiodes.

Photodetector 861 is configured to generate a single-mode tracking signal 863 in response to single-mode light 847B incident on photodetector 861 via scanner 520 and via output coupler 540. In the illustrated implementation, single-mode light 847B also becomes incident on photodetector 861 via input coupler 525 and beam splitter 515. Single-mode tracking signal 863 may be amplified by amplifier 865 and ADC 870 may generate a digital single-mode tracking signal 889 that is provided to processing logic 890.

DCFC 815 directs the multi-mode light 847A from returning light 547 to sensor 560 via multi-mode fiber 819. Sensor 560 is configured to generate a multi-mode tracking signal 862 in response to multi-mode light 847A incident on sensor 560 via scanner 520 and via output coupler 540. In the illustrated implementation, returning multi-mode light 847A also becomes incident on sensor 560 via input coupler 525. Multi-mode tracking signal 862 may be amplified by amplifier 565 and ADC 570 may generate a digital multi-mode tracking signal 888 that is provided to processing logic 890.

Processing logic 890 may be configured to generate an eye-tracking image 893 based at least in part on a plurality of single-mode tracking signals 889 and multi-mode tracking signals 888 that are read-out sequentially from sensor 560 and photodetector 861 as scanner 520 scans through a plurality of imaging points in eyebox 585. In the illustrated implementation, processing logic 890 is configured to drive scanner 520 to progress through the varying scan angles in a scan sequence. Processing logic 890 may generate eye-tracking image(s) 893 based at least in part on single-mode tracking signals 889, multi-mode tracking signals 888, and the event signals 587N.

Figure 9:
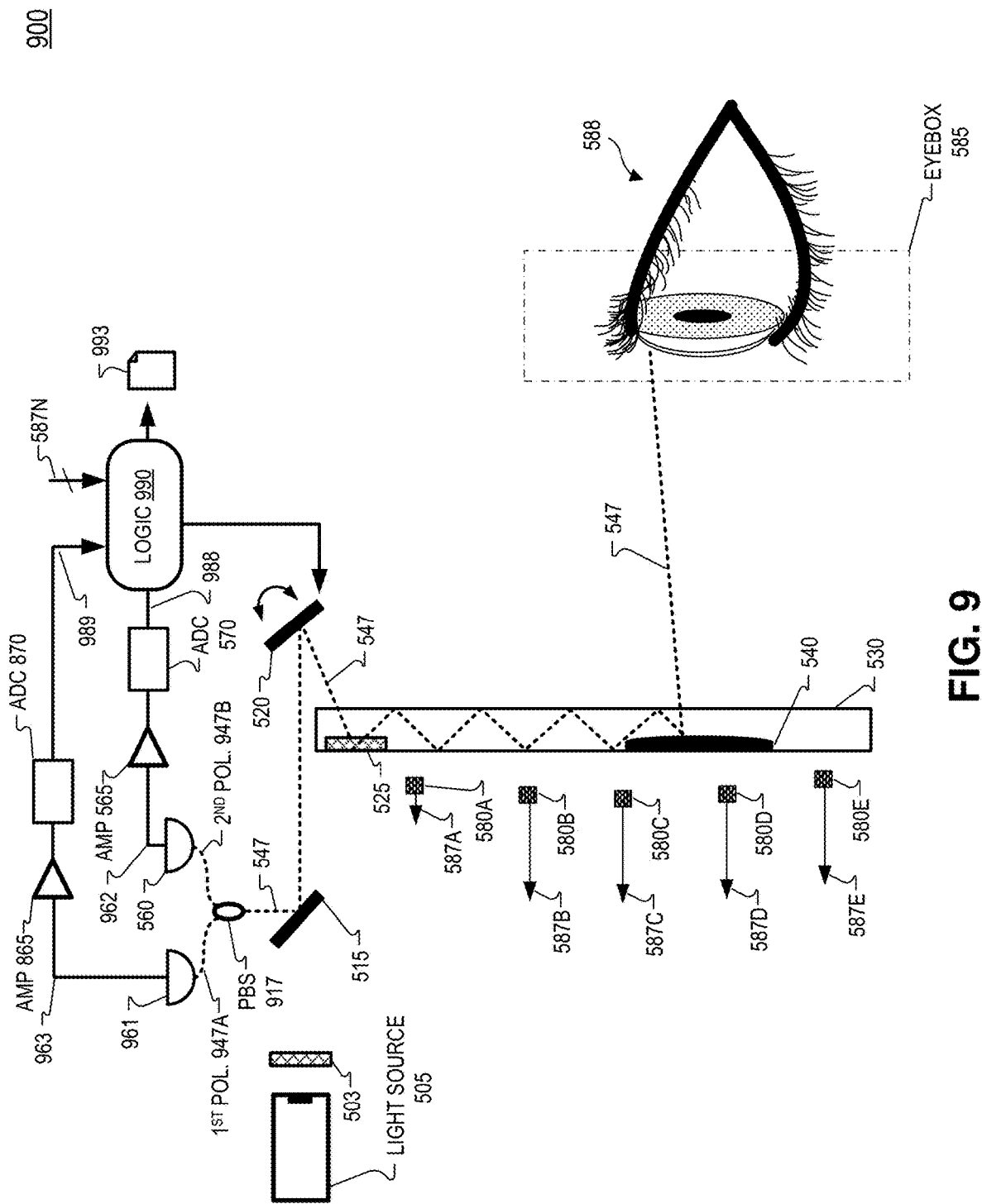
FIG. 9 illustrates a system having a sensing path that is polarization dependent, in accordance with aspects of the disclosure.

FIG. 9 illustrates a system 900 having a sensing path that is polarization dependent, in accordance with implementations of the disclosure. FIG. 9 includes at least a portion of the components of system 500 in FIGS. 5A and 5B. The sensing path of system 900 includes a polarized beam splitter (PBS) 917, a sensor 560, amplifier 565, ADC 570, sensor 961, amplifier 865 and ADC 870. PBS 917 receives returning light 547 and splits returning light 547 into a first polarization orientation 947A and a second polarization orientation 947B. The first polarization orientation may be orthogonal to the second polarization orientation.

Sensor 961 receives the first polarization orientation of returning light 947A and is configured to generate a first-polarization tracking signal 963 in response to the first polarization orientation of returning light 947A incident on sensor 961 via scanner 520 and via output coupler 540. First-polarization tracking signal 963 may be amplified by amplifier 865 and ADC 870 may generate a digital first-polarization tracking signal 989 that is provided to processing logic 990.

Sensor 560 receives the second polarization orientation of returning light 947B and is configured to generate a second-polarization tracking signal 962 in response to the second polarization orientation of returning light 947B incident on sensor 560 via scanner 520 and via output coupler 540. Second-polarization tracking signal 962 may be amplified by amplifier 565 and ADC 570 may generate a digital second-polarization tracking signal 988 that is provided to processing logic 990.

Processing logic 990 may be configured to generate one or more eye-tracking images 993 based at least in part on a plurality of first-polarization tracking signal 963 and second-polarization tracking signal 962 that are read-out sequentially from sensor 560 and sensor 961 as scanner 520 scans through a plurality of imaging points in eyebox 585. In the illustrated implementation, processing logic 990 is configured to drive scanner 520 to progress through the varying scan angles in a scan sequence. Processing logic 990 may generate eye-tracking image(s) 993 based at least in part on digital first-polarization tracking signal 963, digital second-polarization tracking signal 962, and the event signals 587N.

Figure 10A:
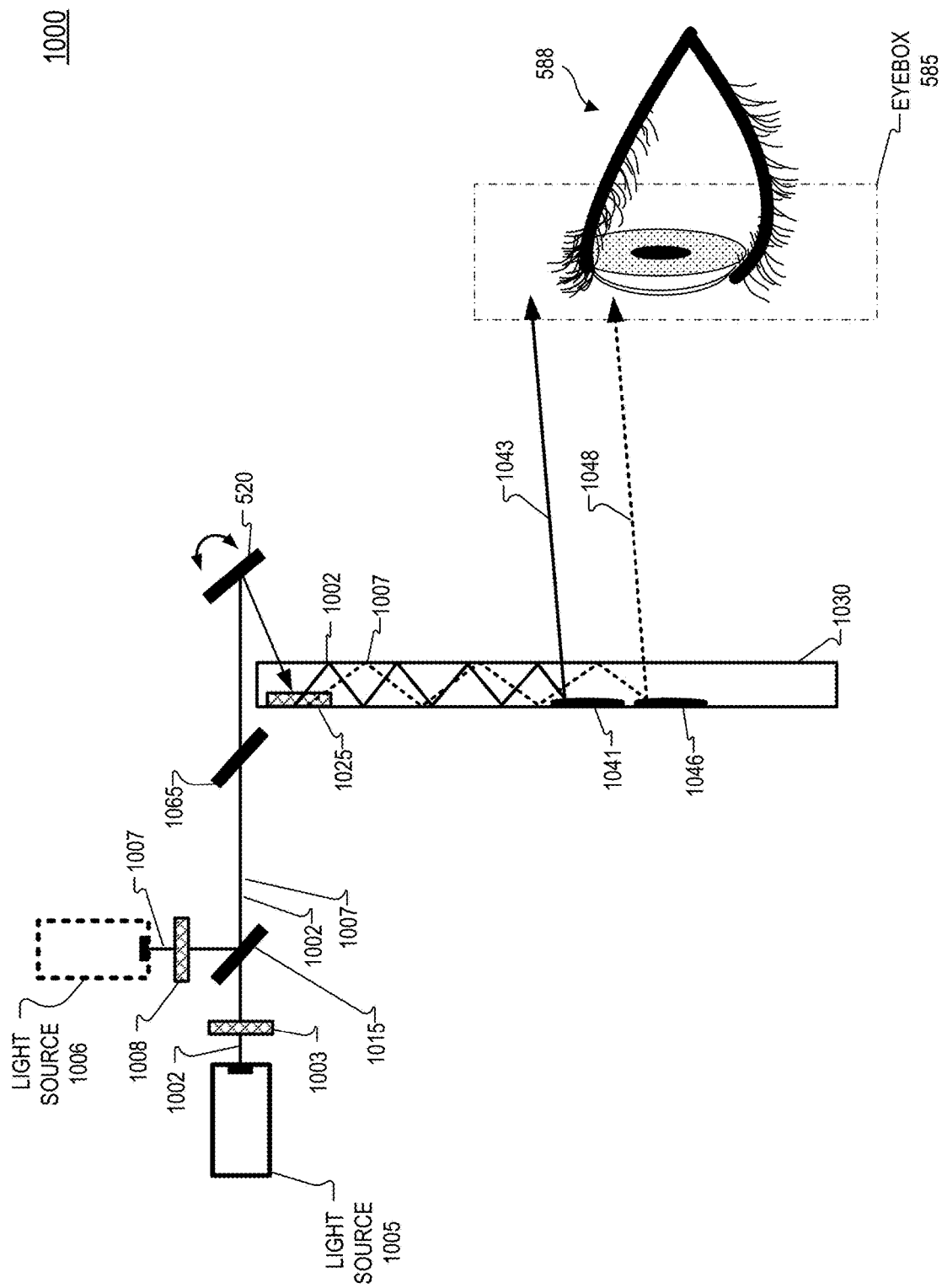
FIG. 10A illustrates an illumination path of a near-eye imaging system having a first output coupler and a second output coupler, in accordance with aspects of the disclosure.

FIG. 10A illustrates an illumination path of a near-eye imaging system 1000 having a first output coupler 1041 and a second output coupler 1046, in accordance with implementation of the disclosure. System 1000 includes a first light source 1005, optional polarizer 1003, a beam splitter 1015, scanner 520, input coupler 1025, and waveguide 1030. First output coupler 1041 and second output coupler 1046 are included in waveguide 1030.

System 1000 may also include a second light source 1006 and a second optional polarizer 1008. In one implementation, first light source 1005 emits first light 1002 having a first wavelength band and second light source 1006 emits second light 1007 having a second wavelength band that is different from the first wavelength. In this implementation, polarizers 1003 and 1008 are not necessarily included in system 1000. The first wavelength band and the second wavelength band may have narrow linewidths. The linewidths may be less than 10 nm. In an implementation, the linewidths are less than 1 nm. At least a portion of light 1002 propagates through beam splitter 1015, propagates through optical element 1065 (e.g. beam splitter), and continues to scanner 520 as first light 1002. At least a portion of light 1007 reflects off of beam splitter 1015, propagates through optical element 1065, and continues to scanner 520 as second light 1007.

Figure 10B:
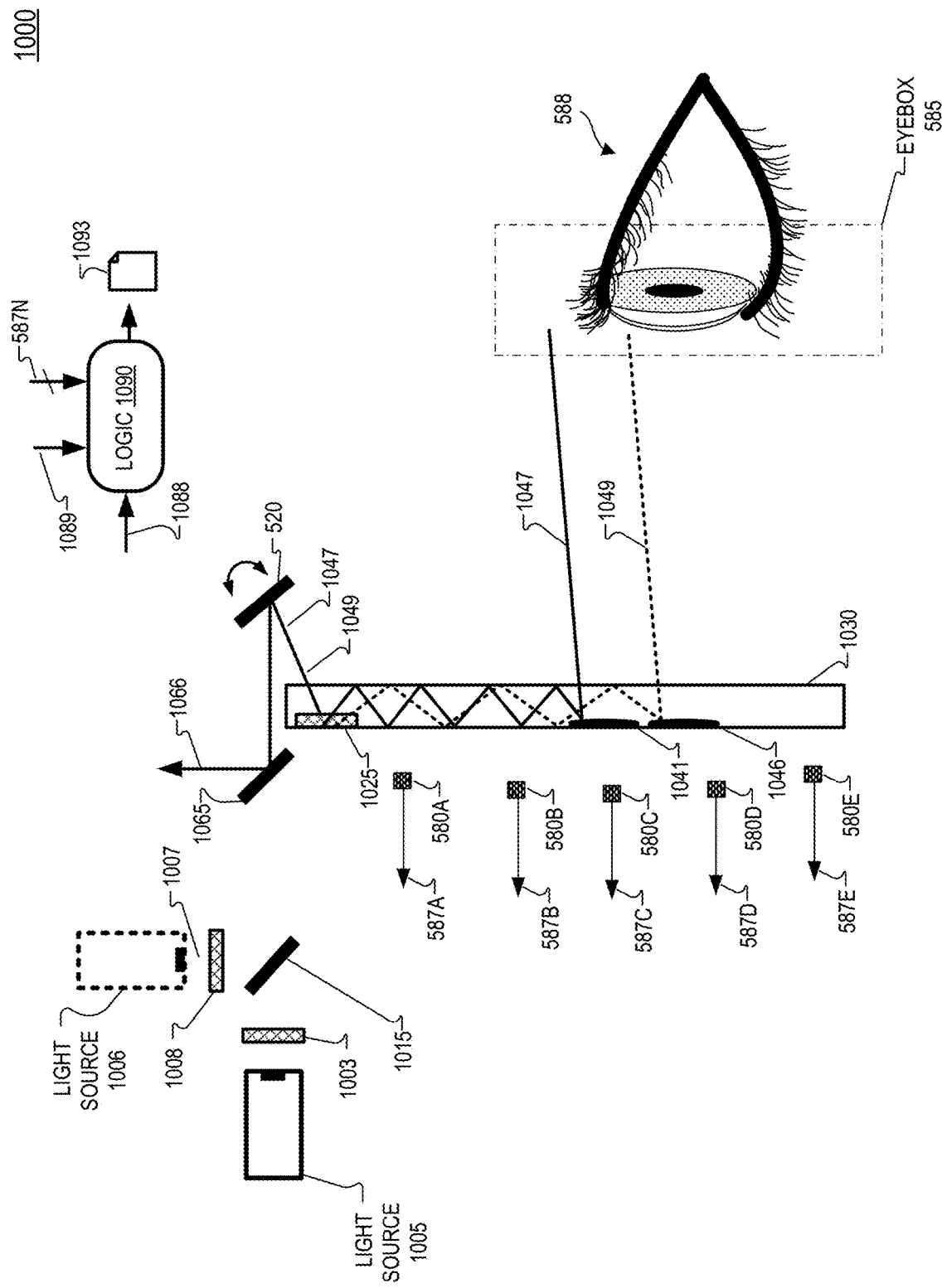
FIG. 10B illustrates a sensing path of near-eye imaging system having a first output coupler and a second output coupler, in accordance with aspects of the disclosure.

Scanner 520 scans first wavelength band light 1002 at varying scan angles, although a single scan angle is illustrated in FIG. 10A for discussion purposes. Scanner 520 may also scan second wavelength band light 1007 at varying scan angles either simultaneously or sequentially with first wavelength band light 1002. Input coupler 1025 may be an HOE configured to incouple first wavelength band light 1002 into waveguide 1030 at different angles than the angles that input coupler 1025 incouples second wavelength band light 1007. For example, the illustrated implementation of FIG. 10B illustrates that first wavelength band light 1002 is incoupled into waveguide 1030 at an angle that allows first wavelength band light 1002 to become incident on output coupler 1041 while second wavelength band light 1007 is incoupled into waveguide 1030 at an angle that allows second wavelength band light 1007 to become incident on output coupler 1046 while not encountering output coupler 1041. First output coupler 1041 is configured to direct first light 1002 to exit waveguide 1030 as first illumination light 1043 to eyebox region 585 (while not diffracting the second wavelength band). Second output coupler 1046 is configured to direct second light 1007 to exit waveguide 1030 as second illumination light 1048 to eyebox region 585. Output couplers 1041 and 1046 may be configured similarly to output coupler 540. For example, output couplers 1041 and 1046 may have negative optical power to generate expanding illumination light 1043 and 1048 to illuminate a larger eyebox region.

FIG. 10B illustrates a sensing path of near-eye imaging system 1000 having a first output coupler and a second output coupler, in accordance with implementations of the disclosure. First returning light 1047 is the portion of first illumination light 1043 being reflected/scattered by eye 588 (or skin/eyelashes) back to output coupler 1041 along a reverse optical path of first illumination light 1043. Second returning light 1049 is the portion of second illumination light 1048 being reflected/scattered by eye 588 (or skin/eyelashes) back to output coupler 1046 along a reverse optical path of second illumination light 1048. First returning light 1047 is incident on output coupler 1041 at a same position as first illumination light 1043 exited output coupler 1041 and output coupler 1041 directs first returning light 1047 to propagate in waveguide 1030 toward input coupler 1025. Input coupler 1025 directs first returning light 1047 back to scanner 520 which reflects the first returning light to optical element 1065. Second returning light 1049 is incident on output coupler 1046 at a same position as second illumination light 1048 exited output coupler 1046 and output coupler 1046 directs second returning light 1048 to propagate in waveguide 1030 toward input coupler 1025. Input coupler 1025 directs second returning light 1048 back to scanner 520 which reflects the second returning light to optical element 1065.

In an implementation where first light 1002 (and first returning light 1047) is a first wavelength band and second light 1007 (and second returning light 1049) is a second wavelength band, a two sensor sensing path similar to the sensing path in FIG. 9 may be utilized. In this context, PBS 917 in FIG. 9 may be replaced with a dichroic mirror that directs (reflects) the first wavelength band to a first sensor (e.g. sensor 861) and passes the second wavelength band to a second sensor (e.g. sensor 560). Each sensor may generate tracking signals in response to the intensity of the respective wavelength bands and those tracking signals may be amplified and digitized by amplifiers and ADCs. FIG. 10B illustrates that a first digitized tracking signal 1089 and a second digitized tracking signal 1088 may be received by logic 1090.

Processing logic 1090 may be configured to generate one or more eye-tracking images 1093 based at least in part on a plurality of first wavelength band tracking signals 1089 and second wavelength band tracking signals 1088 that are read-out sequentially from different sensors as scanner 520 scans through a plurality of imaging points in eyebox 585. Processing logic 1090 may generate eye-tracking image(s) 1093 based at least in part on first wavelength band tracking signals 1089, second wavelength band tracking signals 1088, and the event signals 587N. Having eye-tracking image(s) from different perspectives (a.k.a. stereo imaging or multiview imaging) and at different wavelengths may increase the accuracy of the position of eye 588.

In an implementation, first light 1002 has first polarization orientation and second light 1007 has a second polarization orientation that is different from the first polarization orientation. In this implementation, a first sensor (e.g. sensor 861) in the sensing path is configured to receive the first polarization orientation and a second sensor (e.g. sensor 560) in the sensing path is configured to receive the second polarization orientation. In this context, a polarized beam splitter (e.g. PBS 917) may direct a first polarization orientation of light 1066 to the first sensor and pass the second polarization orientation of light 1066 to the second sensor. Having eye-tracking image(s) from different polarization orientations may decrease image processing requirements since the different surfaces may reflect certain light differently (e.g. cornea may reflect a more uniform polarization orientation than skin or eyelash).

In yet another implementation of system 1000, second light source 1006 is not used and the scan angles of scanner 520 is relied upon to direct light to the different output couplers. For example, output coupler 1041 may be configured to direct the light 1002 having a first scan angle range to exit waveguide 1030 as first illumination light 1043 and second output coupler 1046 may be configured to direct light 1002 having a second scan angle range to exit waveguide 1030 as illumination light 1048. Hence, the first scan angle range being different from the second scan angle range separates when light 1002 and light 1007 is directed to the first output coupler 1041 or second output coupler 1046.

Furthermore, it is understood that the illustrated implementations of FIGS. 10A and 10B are not limited to two wavelengths or two scan angle ranges. Rather, the implementations of system 1000 may be extended to n wavelength and/or n scan angle ranges for generating n views of the eyebox region 585.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye imaging system comprising:
   a light source configured to emit light;
   a waveguide including an output coupler;
   a scanner configured to direct the light to the output coupler at varying scan angles, wherein the waveguide confines the light to guide the light to the output coupler, and wherein the output coupler has negative optical power and is configured to direct the light to exit the waveguide as expanding illumination light toward an eyebox region; and
   a sensor configured to generate a tracking signal in response to returning light incident on the sensor via the scanner and via the output coupler.

2. The near-eye imaging system of claim 1, wherein the waveguide is configured to guide the returning light to the sensor in a reverse optical path of the light propagating through the waveguide.

3. The near-eye imaging system of claim 1, wherein the output coupler is configured to provide a single incidence of the light with the output coupler over the varying scan angles, and wherein the output coupler is configured to provide a single incidence of the returning light with the output coupler over the varying scan angles.

4. The near-eye imaging system of claim 1 further comprising:
   a beam splitter configured to direct the returning light to the sensor, wherein the beam splitter is configured to pass the light emitted by the light source.

5. The near-eye imaging system of claim 4 further comprising:
   a reflective element configured to receive and reflect a portion of the light from the beam splitter, wherein the reflective element is configured to facilitate interferometric detection by reflecting the portion of the light to the sensor.

6. The near-eye imaging system of claim 1 further comprising:
   a double clad fiber coupler (DCFC);
   a dual-clad fiber (DCF) configured to provide the light to the scanner and configured to provide the returning light from the scanner to the DCFC;
   a beam splitter;
   a single mode fiber coupled between the beam splitter and the DCFC;
   a photodetector configured to receive a portion of the light from the beam splitter; and
   a multi-mode fiber coupled between the beam splitter and the sensor.

7. The near-eye imaging system of claim 1 further comprising:
   a polarized beam splitter configured to split the returning light into a first polarization orientation and a second polarization orientation, wherein the sensor is configured to receive the first polarization orientation of the returning light; and
   a second sensor configured to receive the second polarization orientation of the returning light.

8. The near-eye imaging system of claim 1 further comprising:
   an around-the-lens array (ATL) of event-photodetectors configured to receive glint reflections of the expanding illumination light reflecting from the eyebox region, wherein the event-photodetectors are configured to output event signals when an intensity of the glint reflections reaches an event-threshold; and
   processing logic configured to receive (i) the tracking signals from the sensor; and (ii) the event signals from the ATL of event-photodetectors.

9. The near-eye imaging system of claim 8, wherein the processing logic is further configured to overlay glints derived from the event signals over an eye-tracking image derived from the tracking signals.

10. The near-eye imaging system of claim 8, wherein at least a portion of the ATL array of event-photodetectors are angle-sensitive photodetectors.

11. The near-eye imaging system of claim 10, wherein the processing logic is further configured to, in response to the event signals, determine (i) a depth of an eye in the eyebox region; and (ii) a surface-normal of the eye in the eyebox region.

12. The near-eye imaging system of claim 1, wherein the waveguide includes a second output coupler configured to direct second light to exit the waveguide toward the eyebox region.

13. The near-eye imaging system of claim 12, wherein the light has a first polarization orientation and the second light has a second polarization orientation different from the first polarization orientation, wherein near-eye imaging system further comprises:
   a second sensor configured to receive second returning light incident on the second sensor via the scanner, wherein the second returning light has a polarization orientation that is different from the returning light.

14. The near-eye imaging system of claim 12, wherein the light has a first wavelength band different from a second wavelength band of the second light, and wherein the output coupler is configured to direct the light having the first wavelength band to exit the waveguide while not diffracting the second wavelength band, and wherein the second output coupler is configured to direct the second light having the second wavelength band to exit the waveguide.

15. The near-eye imaging system of claim 12, wherein the output coupler is configured to direct the light having a first scan angle range to exit the waveguide, and wherein the second output coupler is configured to direct the second light having a second scan angle range to exit the waveguide, the first scan angle range being different from the second scan angle range.

16. The near-eye imaging system of claim 1, wherein the output coupler includes a holographic optical element (HOE), and wherein the output coupler is configured to focus the returning light to an image plane of the sensor.

17. The near-eye imaging system of claim 1, wherein the waveguide is configured to confine the light and the returning light by total internal reflection (TIR), and wherein the output coupler is configured to cause the light to exit the waveguide by directing the light to exit beyond a critical angle of the waveguide.

18. The near-eye imaging system of claim 1 further comprising:
   processing logic communicatively coupled to the scanner, wherein the processing logic drives the scanner to scan the light to points within the eyebox region to generate an eye-tracking image with a plurality of tracking signals corresponding to each of the points, the tracking signals generated by the sensor.

19. The near-eye imaging system of claim 1, wherein the negative optical power of the output coupler expands the expanding illumination light to illuminate the eyebox region at an eye-relief dimension.

20. A head mounted device comprising:
   a light source configured to emit near-infrared light;
   a waveguide including an output coupler;
   a scanner configured to direct the near-infrared light to the output coupler, wherein the waveguide confines the near-infrared light to guide the near-infrared light to the output coupler; and
   a sensor configured to generate a tracking signal in response to returning near-infrared light incident on the sensor via the scanner, wherein the output coupler is configured to focus the returning near-infrared light to an image plane of the sensor.

* * * * *